(12) United States Patent
Zoppas et al.

(10) Patent No.: US 9,359,099 B2
(45) Date of Patent: Jun. 7, 2016

(54) PLASTIC MATERIAL CONTAINER

(75) Inventors: Matteo Zoppas, Conegliano (IT);
Enrico Zoppas, Conegliano (IT);
Ernesto Eusebione, Mareno di Piave (IT)

(73) Assignees: S.I.P.A. SOCIETA' INDUSTRIALIZZAZIONE PROGETTAZIONE E AUTOMAZIONE S.P.A., Vittorio Veneto (IT); ACQUA MINERALE SAN BENEDETTO S.P.A., Scorze (IT)

( * ) Notice: Subject to any disclaimer, the term of this patent is extended or adjusted under 35 U.S.C. 154(b) by 551 days.

(21) Appl. No.: 12/739,721

(22) PCT Filed: Oct. 23, 2008

(86) PCT No.: PCT/IB2008/054373
§ 371 (c)(1),
(2), (4) Date: Apr. 23, 2010

(87) PCT Pub. No.: WO2009/053921
PCT Pub. Date: Apr. 30, 2009

(65) Prior Publication Data
US 2010/0314348 A1  Dec. 16, 2010

(30) Foreign Application Priority Data
Oct. 23, 2007  (IT) .............................. RM2007A0552

(51) Int. Cl.
*B65D 1/46*  (2006.01)
*B65D 1/02*  (2006.01)
(Continued)

(52) U.S. Cl.
CPC .............. *B65D 1/023* (2013.01); *B65D 1/0246* (2013.01); *B29B 11/08* (2013.01); *B29B 11/14* (2013.01); *B29B 2911/1402* (2013.01); *B29B 2911/1404* (2013.01); *B29B 2911/14026* (2013.01); *B29B 2911/14033* (2013.01); *B29B 2911/1442* (2013.01); *B29B 2911/1444* (2013.01);
(Continued)

(58) Field of Classification Search
CPC .. B65D 1/0246; B65D 41/0471; B29C 49/06; B29B 2911/1402; B29B 2911/14026
USPC .......... 215/40, 43, 44, 42, 902; 220/296, 913; 428/35.7, 36.92
See application file for complete search history.

(56) References Cited

U.S. PATENT DOCUMENTS 6,228,317 B1 * 5/2001 Smith .................. B65D 1/0223
264/521
7,588,808 B2 * 9/2009 Hutchinson ............. B29C 44/04
428/313.3
(Continued)

FOREIGN PATENT DOCUMENTS

DE  202007009983 U1  10/2007
FR  2899567 A  10/2007
WO  2009010520 A1  1/2009

*Primary Examiner* — Fenn Mathew
*Assistant Examiner* — Cynthia Collado
(74) *Attorney, Agent, or Firm* — Knobbe, Martens, Olson & Bear, LLP

(57) ABSTRACT

A plastic material container, e.g. a beverage bottle, having a neck which requires the use of a smaller amount of plastic than the bottle necks of the prior art, and which is able to ensure a complete functionality for coupling the cap, ensuring at the same time the possibility of implementing the traditional supporting; sealing and handling operations of the bottle carried out during the various steps of manufacturing the same.

16 Claims, 7 Drawing Sheets

(51) Int. Cl.
*B29B 11/08* (2006.01)
*B29B 11/14* (2006.01)
*B29K 67/00* (2006.01)
*B29K 105/00* (2006.01)
*B29L 31/00* (2006.01)

(52) U.S. Cl.
CPC ............. *B29B2911/14106* (2013.01); *B29B 2911/14133* (2013.01); *B29B 2911/14326* (2013.01); *B29B 2911/14333* (2013.01); *B29B 2911/14573* (2013.01); *B29B 2911/14753* (2013.01); *B29B 2911/14793* (2013.01); *B29K 2067/00* (2013.01); *B29K 2105/258* (2013.01); *B29L 2031/7158* (2013.01)

(56) References Cited

U.S. PATENT DOCUMENTS

| | | | | |
|---|---|---|---|---|
| 7,735,663 B2 * | 6/2010 | Tanaka | ............... | B65D 1/0223 215/42 |
| 7,976,767 B2 * | 7/2011 | Ungrady | ............... | B29B 11/14 215/40 |
| 8,857,637 B2 * | 10/2014 | Darr | ............... | B29B 11/08 215/44 |
| 2001/0030163 A1 * | 10/2001 | Rashid | ............... | B29B 11/08 215/12.1 |
| 2005/0150856 A1 * | 7/2005 | Ozawa | ............... | B65D 1/0246 215/44 |
| 2005/0263476 A1 | 12/2005 | Harrison et al. | | |
| 2007/0034591 A1 | 2/2007 | Flak, Jr. et al. | | |
| 2007/0045216 A1 | 3/2007 | Gami et al. | | |
| 2007/0108668 A1 * | 5/2007 | Hutchinson | ............... | B29C 33/04 264/521 |
| 2007/0292642 A1 * | 12/2007 | Ungrady | ............... | B29B 11/14 428/35.7 |
| 2009/0134116 A1 * | 5/2009 | Roussy | ............... | B65D 41/0428 215/317 |
| 2010/0178148 A1 * | 7/2010 | Forsthoevel | ............... | B65D 1/023 414/751.1 |

* cited by examiner

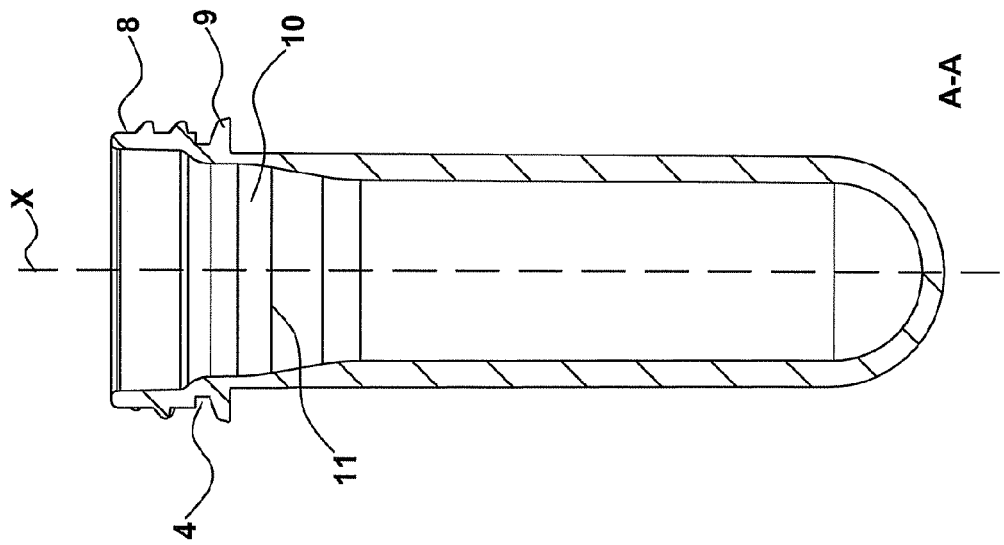
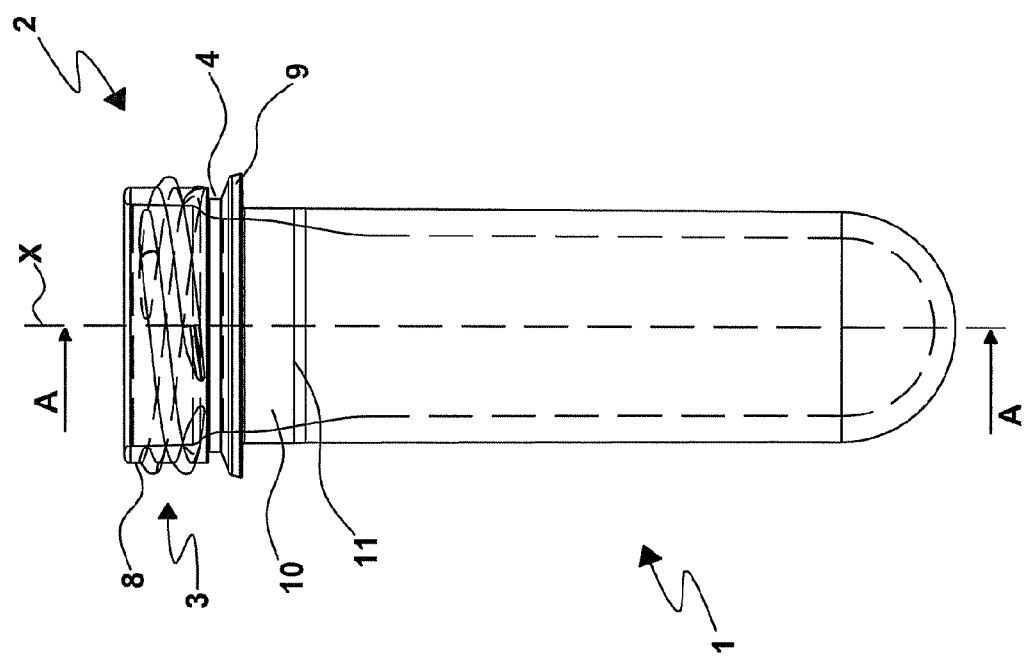

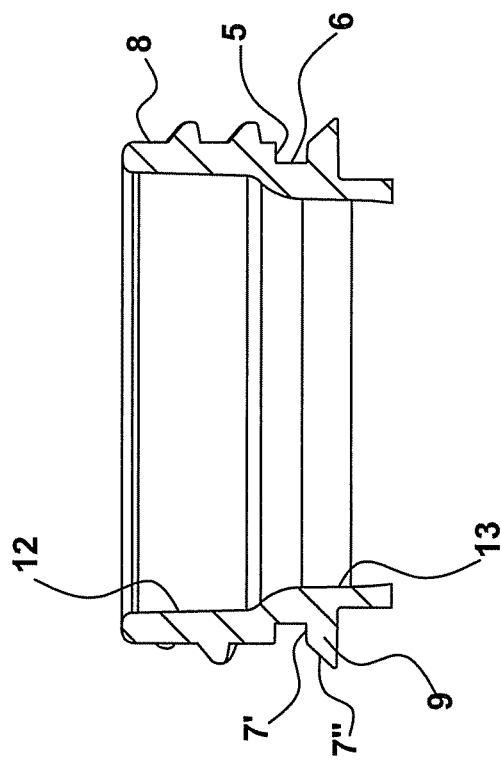
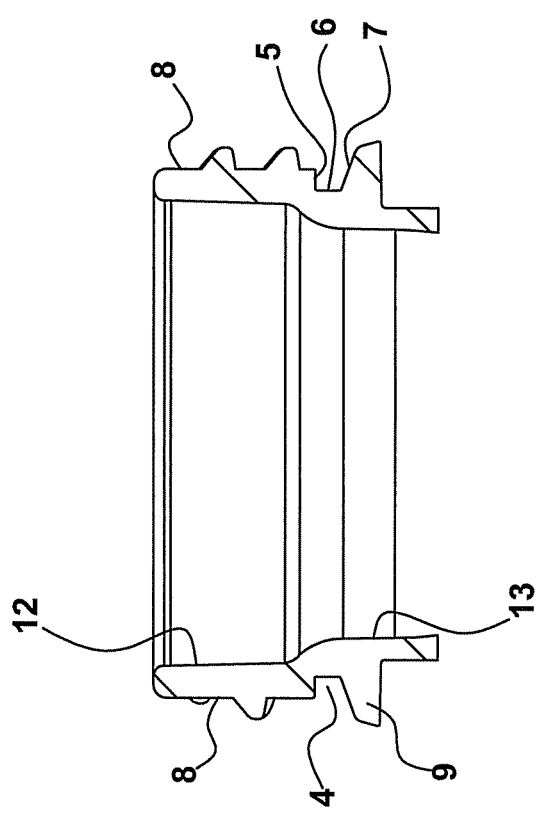

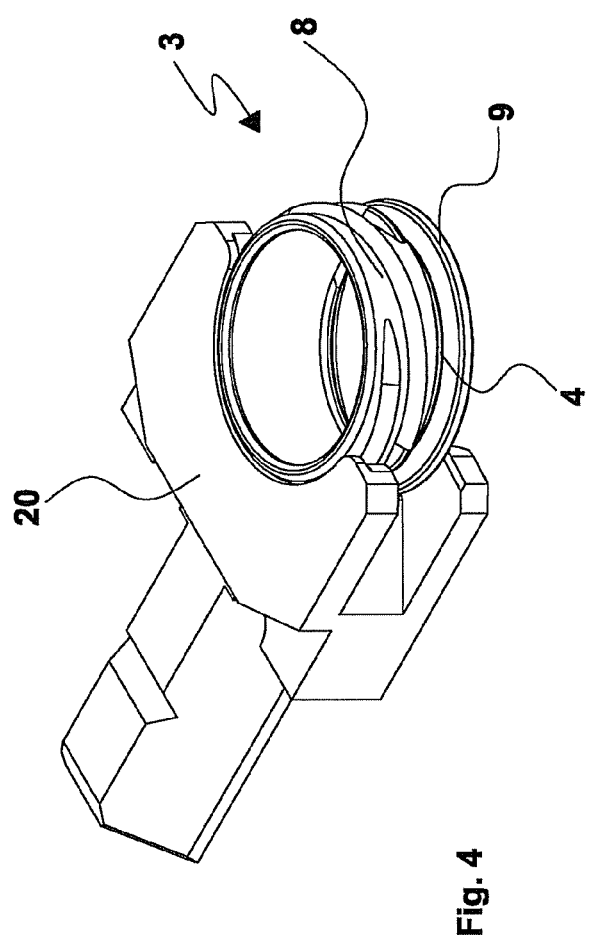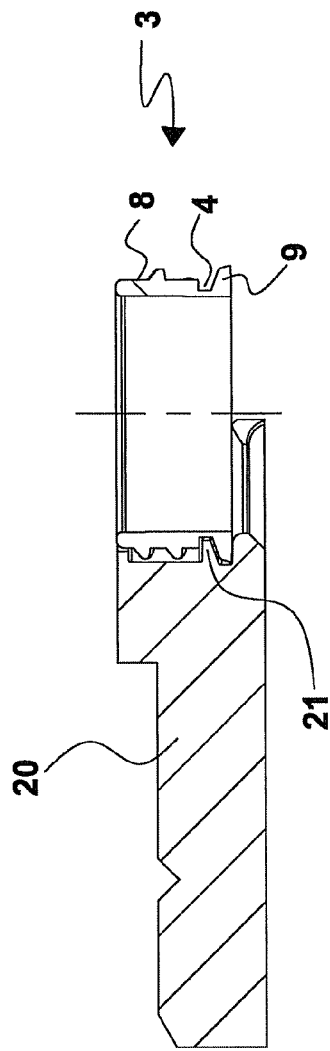
Fig. 4
Fig. 5

PLASTIC MATERIAL CONTAINER

This application is U.S. National Phase of International Application No. PCT/IB2008/054373, filed Oct. 23, 2008 designating the U.S., and published in English as WO 2009/053921 on Apr. 30, 2009, which claims priority to Italian Patent Applications No. RM2007A000552, filed Oct. 23, 2007.

FIELD OF THE INVENTION

The present invention relates to a plastic material container, e.g. to a bottle intended to contain liquid for human consumption, such as beverages or mineral water.

STATE OF THE ART

The plastic material bottles which are currently intended to contain mineral water are normally provided with an upward tapered neck, which ends at the top in a cylindrical tubular segment, which is sealed by a closure which, in turn, consists of a cup-shaped cap and an annular seal. Such an annular seal is connected to the cup-shaped cap by means of a series of connecting joints having a scheduled rupture. Such joints serve the function of ensuring the complete sealing of the cup-shaped cap and the absence of possible tampering of the closure of said bottle.

Specifically, the cylindrical tubular segment consists of:
  a threaded end portion onto which the cup-shaped cap may be screwed;
  a seal tearing crown positioned close to the lower end of the threaded end portion;
  and an annular flange for conveying the preform or bottle, positioned at a predetermined distance from the seal tearing crown, so as to define, with the latter, an annular seat adapted to be firmly engaged by the annular seal of the closure.

The annular conveying flange and the annular contact portion of the cylindrical tubular segment underneath said flange are instead intended to slide on the longitudinal guides which envelop the neck of the bottle from both sides, and are adapted to support the bottle while the same advances inside the bottling system. As known, companies in the industry need to be able to reduce the size of the cylindrical tubular segment and/or of the corresponding aforesaid annular components in order to reduce the amount of plastic required to make each bottle. Unfortunately such a reduction is difficult to be implemented due to a series of structural and functional constraints. Indeed, being sealable with standard size plastic caps, the bottle must have a threaded end segment of predetermined height not smaller than the standard height of the cap, and an annular seat also having a predetermined height which may not be smaller than the standard height of the annular seal of the closure.

Furthermore, the annular contact portion must be dimensioned so as to allow, on one hand, a complete, safe supporting of the bottle on the feeding guides and, on the other hand, to offer an external surface which is broad enough to allow the gripping members in the bottling system to safely withhold the bottle. Therefore, the height of the annular contact portion is a dimensional constraint which may not be smaller than a predetermined value related to the dimensions of the gripping members which intervene on the bottle, such as gripping hands and forks. It is thus apparent that the above described dimension constraints do not allow to reduce the total height of the cylindrical tubular segment.

The need to make a plastic material container having a neck which allows to overcome the aforesaid drawbacks is therefore felt.

SUMMARY OF THE INVENTION

It is the main object of the present invention to make a plastic material container having a neck which requires the use of a smaller amount of plastic than the bottle necks of the prior art, and which is able to ensure a complete functionality for coupling the cap, thus ensuring at the same time the possibility of implementing the traditional supporting, sealing and handling operations of the bottle carried out during the various steps of manufacturing the same.

The neck of the container of the present invention further allows a convenient handling of the container downstream of the manufacturing system, where the container is supported under the neck ring by appropriate feeding guides.

The present invention therefore suggests to solve the above discussed problems and to reach the aforesaid objects by making a plastic material container which, in accordance with claim 1, has a neck including a cylindrical tubular segment, defining a longitudinal axis, in which there are provided a threaded end portion for screwing a cap of said container thereon; an annular protrusion, serving as a seal tearing of the container cap; an annular groove, arranged between said threaded end portion and said annular protrusion, for gripping the container by appropriate gripping members; wherein said annular groove is made on the base surface of the thread of said threaded end portion and forms a recess with respect to such a base surface.

Including an annular groove between the threaded portion and the single neck ring of the cylindrical tubular segment of the neck advantageously offers an external surface which is abroad enough to allow the gripping members provided in the forming system to safely withhold the preform or the bottle.

Therefore, the height of the annular contact portion no longer represents a dimensional constraint. This fact, along with the presence of a single neck ring or annular ridge, serving the two-fold function of seal tearing crown and conveying support flange, determines a considerable reduction of the plastic material requried for making the bottle neck.

The dependent claims describe preferred embodiments of the invention.

BRIEF DESCRIPTION OF THE DRAWINGS

Further features and advantages of the present invention will be more apparent in the light of the detailed description of preferred, but not exclusive, embodiments of a plastic material container illustrated by way of non-limitative example, with the aid of the accompanying drawings, in which:

FIG. 1 shows a view of a preform provided with a neck according to the present invention;

FIG. 2 shows a cross section of the preform in FIG. 1;

FIG. 3 shows an enlargement of the section of the neck in FIG. 2;

FIG. 3a shows an enlargement of the section of a variant of the preform neck of the invention;

FIG. 4 shows a preform-holding fork appropriate for conveying preforms with the neck of the invention;

FIG. 5 shows a section of part of the fork in FIG. 4;

DETAILED DESCRIPTION OF A PREFERRED EMBODIMENT OF THE INVENTION

Figure 7:
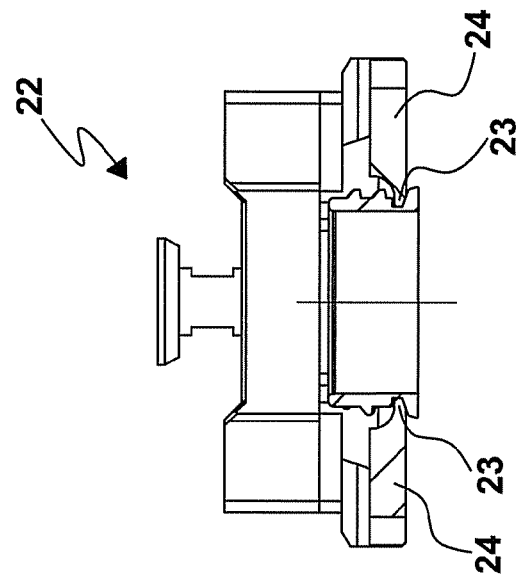
FIG. 7 shows a section of the gripping hand in FIG. 6.

With reference to FIGS. from 1 to 3, numeral 1 represents a plastic material preform, e.g. for manufacturing a beverage bottle, including a preferred embodiment of a bottle neck according to the present invention.

The preform 1, e.g. made of PET (Polyethylene terephthalate) or any other similar plastic material, is provided with a neck 2, defining a longitudinal axis X, which ends at the top in a cylindrical tubular segment 3, which is adapted to be sealed by a closure which, in turn, consists of a cup-shaped cap and an annular seal. Said annular seal is connected to the cup-shaped cap by means of a series of connecting joints having a scheduled rupture. Such joints serve the function of ensuring the complete sealing of the cap and the absence of possible tampering of the closure of the bottle.

Specifically, the cylindrical tubular segment 3 includes a threaded end portion 8, onto which the cup-shaped cap is screwed, and a single annular ridge or neck ring 9, which is advantageously able to perform both the function associated to the annular conveying flange, and the function associated to the seal tearing crown; said flange and said crown being provided in the neck of the preforms or bottles of the state of the art.

The thread of the threaded end portion 8 starts at a predetermined distance from the open end of the neck 2 so as to allow to insert the end edge of the neck into the annular seat provided in the closing cap to ensure an optimal sealing.

More in detail, the annular ridge 9 is adapted to perform the functions of conveying support and sealing, both associated to the annular conveying flange, i.e. is shaped so as to be able to slide on longitudinal guides which support the bottle neck from both sides to support and withhold the bottle while it advances downstream of the container manufacturing system.

Furthermore, the annular ridge 9 is adapted to perform the "seal tearing" function associated to the seal tearing crown, i.e. is shaped so as to keep the annular seal arranged in a predetermined position at the lower end of the cylindrical tubular segment 3 arranged underneath the annular ridge 9, upon the engagement of the cap onto the neck 2 of the bottle.

The annular ridge 9 delimitates an annular portion 10 in the part underneath the cylindrical tubular segment 3, opposite to the threaded end portion 8, which annular portion 10 serves the function of both housing the annular seal of the cup-shaped cap and cooperating with the annular ridge 9 to slide on the longitudinal feeding and conveying guides of the bottle 1 downstream of the container manufacturing system.

More in detail, the annular portion 10 is defined by the portion of the cylindrical tubular segment 3 comprised between the annular ridge 9 and the joining section 11 between the lower end of the cylindrical tubular segment 3 itself and the neck segment of the containing body of the bottle.

Specifically, the joining section 11 is placed on the circular line which delimits the lower end of the cylindrical tubular segment 3, having an external diameter $d_1$, and the neck segment 2 which extends downwards with a progressively decreasing internal diameter with respect to the internal diameter of the lower end of the cylindrical tubular segment 3. The annular portion 10 is dimensioned so as to have a height, measured between the annular ridge 9 and the joining section 11, either greater than or equal to the height of the annular seal and an external diameter $d_1$ smaller than the external diameter $d_2$ of the threaded end portion 8.

The height of the said annular portion 10 preferably has a value of 2-3 millimeters, while its external diameter $d_1$ has a value of $d_1=d_3-K_1$, where $d_3$ is the external diameter of the annular ridge 9, while $K_1$ is a value between 2 and 8 millimeters.

Advantageously, the bottle neck according to the present invention is provided with an annular groove 4, placed between the threaded portion 8 and the annular ridge or neck ring 9 of the cylindrical tubular segment 3. Such a groove 4 is made on the base surface of the thread of the threaded portion 8 to ensure a more firm grip by the gripping members provided in the manufacturing system. Therefore, the bottom of the groove 4 is less distant than the base surface of the thread with respect to the longitudinal axis X.

Advantageously, the internal section of the cylindrical tubular segment 3 has a cylindrical shape in the upper part thereof and advantageously has a narrowing at the annular groove 4 so as to allow to make the groove itself in an appropriate thickness to the preform and to avoid a structural weakening. The thickness of the neck 2 is indeed kept substantially constant, by means of said narrowing, in the passage from a first internal cylindrical segment 12, proximal to the open end of the neck, to a second internal cylindrical segment 13, having a diameter smaller than said first segment and corresponding to the zones of the groove 4 and of the annular ridge 9.

The neck of the container of the present invention is obtained by means of injection molding and is not modified by the step of blow molding which allows to obtain the containing body of the container. The neck indeed remains outside the blowing mould during this last step.

Such an annular groove 4, in a first preferred embodiment thereof, has a saw-toothed shape section. Specifically, with reference to the section in FIG. 3, the profile of the neck 2 has a recess, at the lower end of the threaded portion 8, defined by:

a first rectilinear segment 5, the extension of which is substantially perpendicular to the longitudinal axis X of the neck;

a second rectilinear segment 6, either substantially parallel or inclined by a small angle with respect to the longitudinal axis X of the neck;

and a third rectilinear segment 7, belonging to the upper surface of the ridge 9, inclined with respect to the second segment 6 by a predetermined angle comprised between 45 and 75°, preferably 60°.

The angle enclosed between the first segment 5 and the second segment 6 may, instead, vary between 80 and 100°, being preferably equal to 90°.

In a second preferred embodiment shown in FIG. 3a, the profile of the annular groove 4 has, unlike the embodiment in FIG. 3, a third rectilinear segment 7', belonging to the upper surface of the ridge 9 and substantially perpendicular to the longitudinal axis X of the neck, and a fourth rectilinear segment 7", this also belonging to the upper surface of the ridge 9 but inclined with respect to the second segment 6 by a predetermined angle comprised between 45 and 75°, preferably 60°. The angle enclosed between the second segment 6 and the third segment 7' may, instead, vary between 80 and 100°, being preferably equal to 90°.

Figure 6:
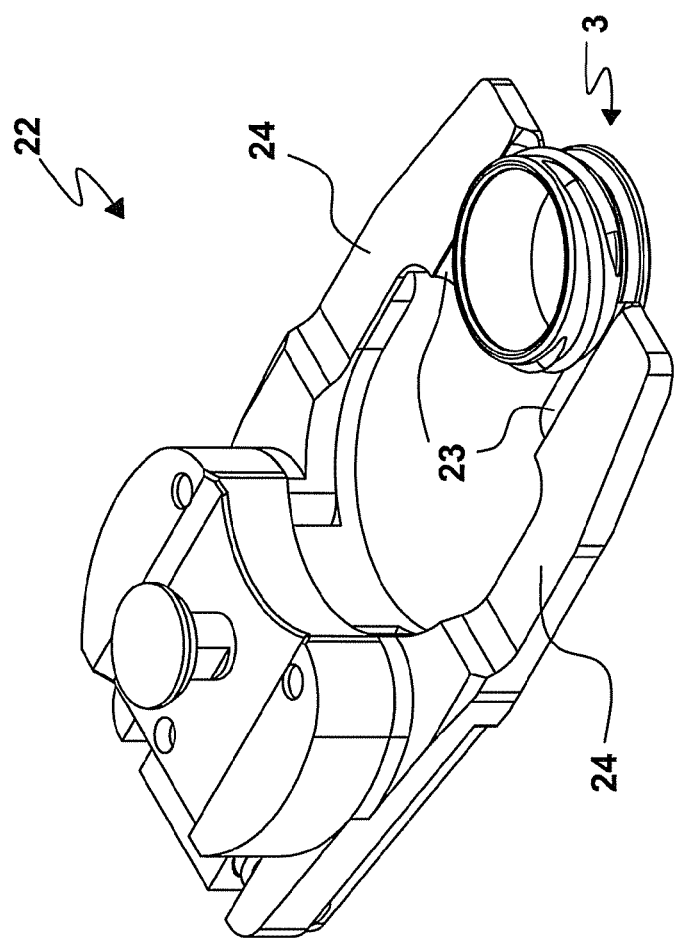
FIG. 6 shows a gripping hand appropriate for gripping preforms with the neck of the invention.

The annular groove 4, in both embodiments, advantageously allows to grip the preform by both a preform-holding fork 20, like that shown in FIGS. 4 and 5, and a gripping hand 22, like that shown in FIGS. 6 and 7.

Advantageously, the preform-holding fork 20 is provided with an appropriately shaped protrusion 21 to engage at least a part of the annular groove 4 of the preform neck. The fork 20 may also engage the bottoms of the thread of the threaded portion 8.

Figure 8:
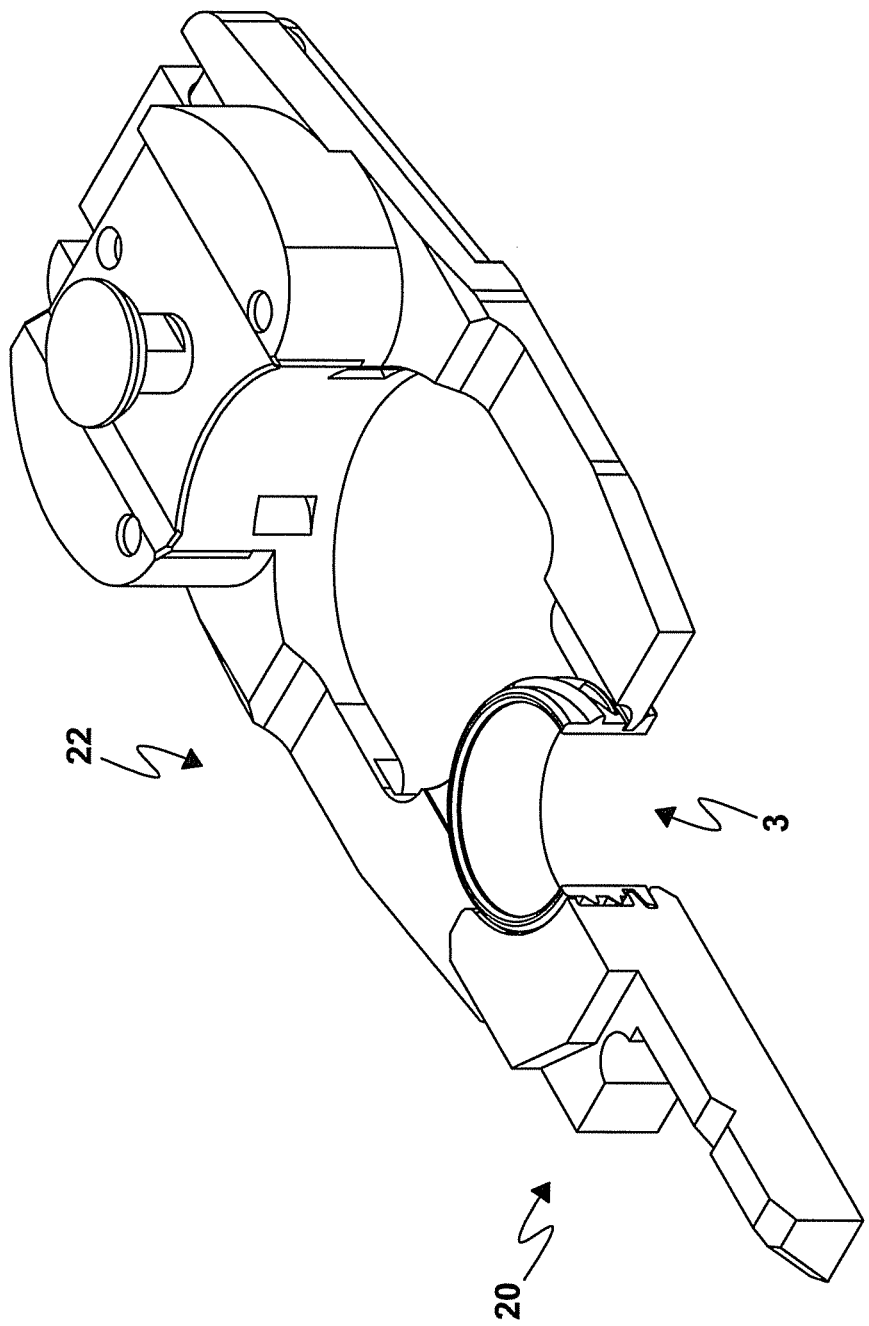
FIG. 8 shows a perspective view of a reciprocally cooperating gripping hand and a preform-holding fork.
Figure 11:
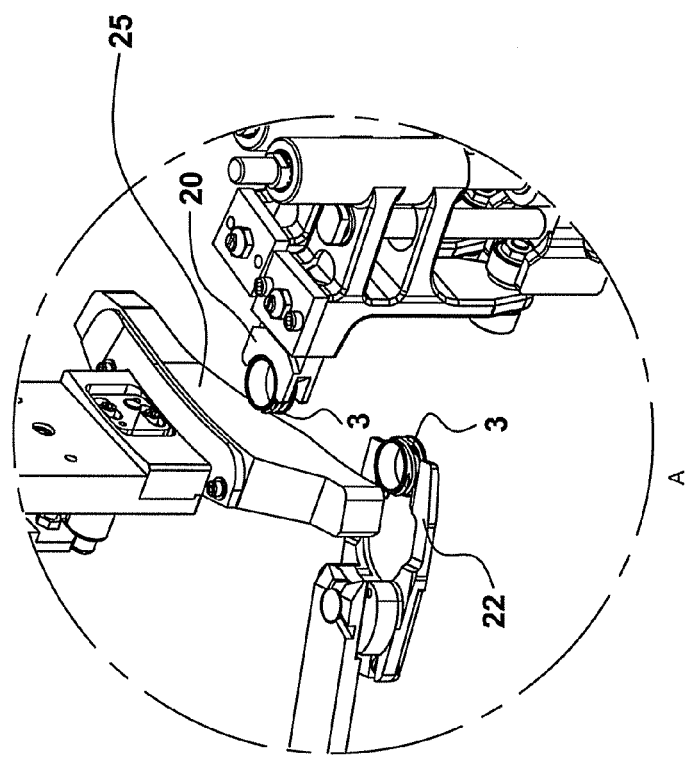
FIG. 11 shows an enlargement of the view in FIG. 10.
Figure 10:
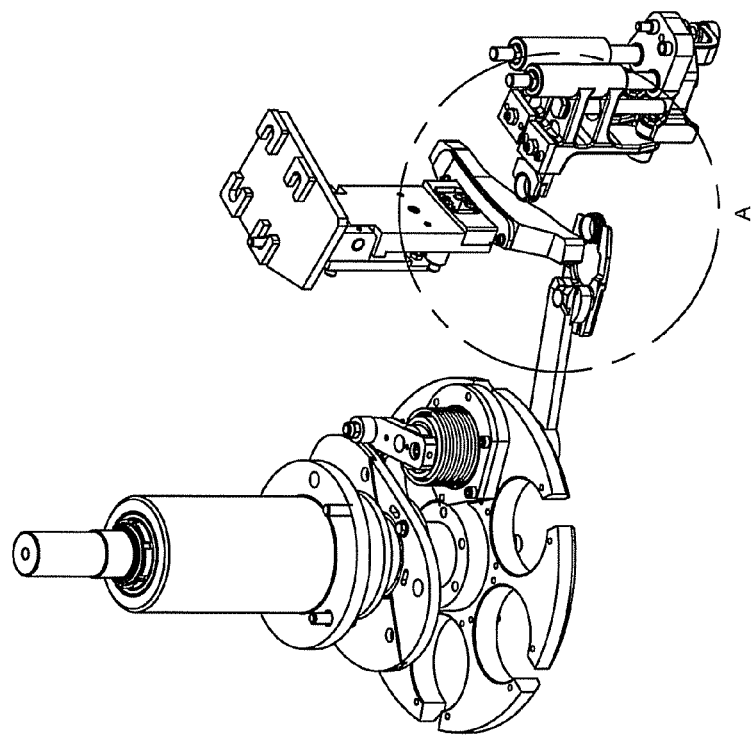
FIG. 10 shows a perspective view of a part of the bottle manufacturing system.

Advantageously, the gripping hand 22 also is provided with protrusions 23, formed along the gripping arms 24, adapted to engage a part of the annular groove 4. FIG. 8 shows the moment in which the fork 20 and the gripping hand 22 interact for passing the preform from one another. FIGS. 10 and 11 show the moment of the descent of a preform held by a fork 20, by means of a cam system 25, for the transfer to a revolving turntable provided with gripping hands 22.

Figure 9A:
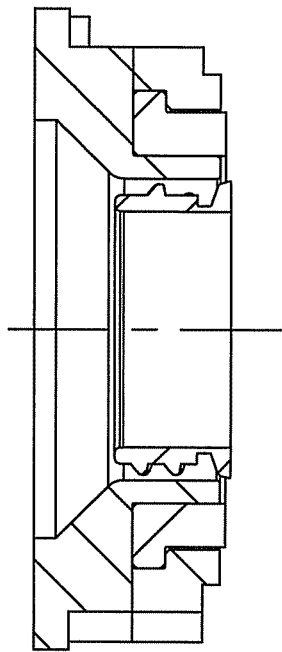
FIGS. 9a and 9b show two cross sections of the sealing device in FIG. 9.
Figure 9B:
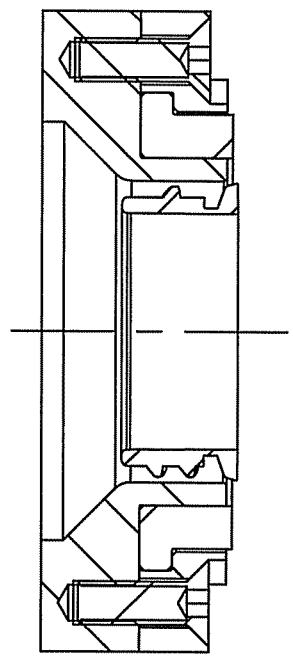
Figure 9:
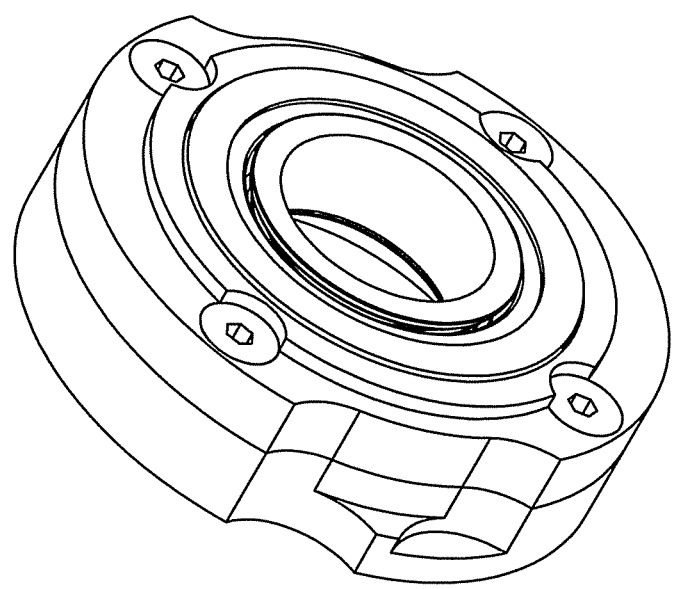
FIG. 9 shows a device for sealing the neck according to the invention.

FIGS. 9, 9a, and 9b show a device for sealing the bottle neck according to the invention.

What is claimed is:

1. A plastic material container comprising:
   a neck comprising a cylindrical tubular segment, defining a longitudinal axis,
   a threaded end portion for screwing a cap of said container thereon, said threaded end portion comprising a thread and a threaded base surface,
   a single annular protrusion serving both a container cap seal tearing function and a conveying support flange function, and
   an annular groove arranged between said threaded end portion and said annular protrusion, for a grip of the container by appropriate gripping members,
   wherein said annular groove is present on the threaded base surface and forms a recess with respect to the threaded base surface such that a bottom surface, closest to said longitudinal axis, of said annular groove is closer to the longitudinal axis than the threaded base surface is to the longitudinal axis.

2. The container according to claim 1, wherein an internal section of the cylindrical tubular segment comprises a narrowing at said annular groove.

3. The container according to claim 2, wherein said annular groove comprises a saw-toothed shape profile.

4. The container according to claim 3, wherein a profile of said annular groove is defined by a first rectilinear segment, an extension of which is substantially perpendicular to the longitudinal axis, a second rectilinear segment, substantially parallel to the longitudinal axis, and a third rectilinear segment, belonging to an upper surface of the annular protrusion and inclined with respect to the second segment by a predetermined angle.

5. The container according to claim 4, wherein said predetermined angle is between 45 and 75°.

6. The container according to claim 4, wherein the first rectilinear segment and the second rectilinear segment enclose an angle between 80 and 100°.

7. The container according to claim 4, wherein said predetermined angle is 60°.

8. The container according to claim 4, wherein the first rectilinear segment and the second rectilinear segment enclose an angle equal to 90°.

9. The container according to claim 3, wherein a profile of said annular groove is defined by a first rectilinear segment, an extension of which is substantially perpendicular to the longitudinal axis, a second rectilinear segment, substantially parallel to the longitudinal axis, a third rectilinear segment, belonging to the upper surface of the annular protrusion and substantially perpendicular to the longitudinal axis, and a fourth rectilinear segment, belonging to an upper surface of the annular protrusion and inclined with respect to the second segment by a predetermined angle.

10. The container according to claim 9, wherein said predetermined angle is between 45 and 75°.

11. The container according to claim 9, wherein said predetermined angle is 60°.

12. The container according to claim 9, wherein the first rectilinear segment and the second rectilinear segment enclose an angle between 80 and 100°.

13. The container according to claim 9, wherein the first rectilinear segment and the second rectilinear segment enclose an angle equal to 90°.

14. A plastic material container comprising:
   a neck comprising a cylindrical tubular segment, defining a longitudinal axis,
   a threaded end portion for screwing a cap of said container thereon, said threaded end portion comprising thread and a threaded base surface,
   a single annular protrusion serving both a container cap seal tearing function and a conveying support flange function, and
   an annular groove arranged between said threaded end portion and said annular protrusion, for a grip of the container by appropriate gripping members,
   wherein said annular groove is present on the threaded base surface and forms a recess with respect to the threaded base surface such that a bottom surface, closest to said longitudinal axis, of said annular groove is closer to the longitudinal axis than the threaded base surface is to the longitudinal axis, and
   wherein an interior of the cylindrical tubular segment comprises a narrowing at said annular groove.

15. The plastic material container according claim 14, wherein a thickness of the neck is substantially constant in the passage from a first internal cylindrical segment of the neck, corresponding to the zone of the threaded end portion, to a second internal cylindrical segment of the neck, corresponding to the zones of the annular groove and of the annular protrusion.

16. The plastic material container according claim 14, wherein a first internal cylindrical segment of the neck, corresponding to the zones of the annular groove and of the annular protrusion, has a diameter smaller than a diameter of a second internal cylindrical segment of the neck, corresponding to the zone of the threaded end portion.

* * * * *